(12) United States Patent
Chen et al.

(10) Patent No.: US 12,206,086 B2
(45) Date of Patent: Jan. 21, 2025

(54) DEVICE FOR SUPPLEMENTING ELECTRODE SHEET WITH LITHIUM AND METHOD FOR SUPPLEMENTING ELECTRODE SHEET WITH LITHIUM

(71) Applicant: CONTEMPORARY AMPEREX TECHNOLOGY (HONG KONG) LIMITED, Hong Kong (CN)

(72) Inventors: Shitong Chen, Ningde (CN); Zhijie Gong, Ningde (CN); Bin Xie, Ningde (CN); Lin Ma, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 396 days.

(21) Appl. No.: 17/575,164

(22) Filed: Jan. 13, 2022

(65) Prior Publication Data

US 2022/0140311 A1 May 5, 2022

Related U.S. Application Data

(63) Continuation of application No. PCT/CN2020/100292, filed on Jul. 4, 2020.

(30) Foreign Application Priority Data

Jul. 22, 2019 (CN) .......................... 201921156786.0

(51) Int. Cl.
*H01M 4/04* (2006.01)
*H01M 4/1395* (2010.01)

(52) U.S. Cl.
CPC ....... *H01M 4/0435* (2013.01); *H01M 4/1395* (2013.01)

(58) Field of Classification Search
CPC ........................... H01M 4/435; H01M 4/1395
See application file for complete search history.

(56) References Cited

FOREIGN PATENT DOCUMENTS

| CN | 201618705 U | * | 11/2010 |
| CN | 103889605 A |   | 6/2014  |

(Continued)

OTHER PUBLICATIONS

Machine translation CN201618705U (Year: 2010).*

(Continued)

*Primary Examiner* — Jacob T Minskey
*Assistant Examiner* — Wayne K. Swier
(74) *Attorney, Agent, or Firm* — Kilpatrick Townsend & Stockton LLP (57) ABSTRACT

A device for supplementing an electrode sheet with lithium and a method for supplementing electrode sheet with the lithium. The device includes two first rolling wheels, a second rolling wheel, a lithium ribbon providing mechanism, a first transfer film conveying mechanism, a second transfer film conveying mechanism and an electrode sheet providing mechanism; the two first rolling wheels are opposite each other, and the second rolling wheel is adjacent to the first rolling wheel; the lithium ribbon providing mechanism is used for feeding a lithium ribbon between the second rolling wheel and the first rolling wheel; the first transfer film conveying mechanism is used for conveying a first transfer film carrying a first release agent and transferring the first release agent to the lithium ribbon; the electrode sheet providing mechanism is used for providing the electrode sheet.

10 Claims, 9 Drawing Sheets

(56) References Cited

FOREIGN PATENT DOCUMENTS

| CN | 104842626 | A |   | 8/2015  |         |          |
|----|-----------|---|---|---------|---------|----------|
| CN | 204558583 | U |   | 8/2015  |         |          |
| CN | 106252606 | A |   | 12/2016 |         |          |
| CN | 107236144 | A | * | 10/2017 |         |          |
| CN | 206878098 | U |   | 1/2018  |         |          |
| CN | 207558931 | U |   | 6/2018  |         |          |
| CN | 108598372 | A | * | 9/2018  | ........ | H01M 4/0435 |
| CN | 108899468 | A |   | 11/2018 |         |          |
| CN | 110010844 | A | * | 7/2019  | ........ | H01M 4/0435 |
| CN | 210040395 | U |   | 2/2020  |         |          |
| JP | 5151188   | B2 | * | 2/2013  |         |          |
| JP | 2018130759 | A |   | 8/2018  |         |          |

OTHER PUBLICATIONS

Machine translation CN206878098U (Year: 2018).*
Machine translation CN110010844A (Year: 2019).*
Machine translation JP5151188B2 (Year: 2013).*
Machine translation CN107236144A (Year: 2017).*
Machine translation CN108598372A (Year: 2018).*
Search Report issued on May 20, 2022 in corresponding European Application 20843419.1; 10 pages.
Notice of Allowance issued on Dec. 20, 2019, in connection with corresponding Chinese Application No. 201921156786.0; 1 page.
International Search Report (with English translation) and Written Opinion (with Machine translation) issued on Oct. 12, 2020 in corresponding International Patent Application No. PCT/CN2020/100292; 13 pages.

* cited by examiner

DEVICE FOR SUPPLEMENTING ELECTRODE SHEET WITH LITHIUM AND METHOD FOR SUPPLEMENTING ELECTRODE SHEET WITH LITHIUM

CROSS-REFERENCE TO RELATED APPLICATIONS

The application is a continuation of International Application No. PCT/CN2020/100292, filed on Jul. 4, 2020, which claims priority to Chinese Patent Application No. 201921156786.0, filed with the China National Intellectual Property Administration on Jul. 22, 2019. The disclosures of the aforementioned applications are hereby incorporated by reference in their entireties.

TECHNICAL FIELD

The application relates to the field of battery production, and particularly relates to a device for supplementing an electrode sheet with lithium and a method for supplementing the electrode sheet with the lithium.

BACKGROUND

In recent years, along with the vigorous development of electric automobiles, requirements for the energy density of a power battery are increasingly strict, for a negative electrode sheet, part of lithium is consumed due to the formation of a solid electrolyte interphase (SEI) in the first charge process of the battery, and then the loss of the lithium, a positive electrode material, is caused, thereby resulting in reduction of the capacity of the battery, and reduction of the first efficiency. This is particularly pronounced in the negative electrode sheet using alloy materials (for example, silicon alloys, tin alloys, etc.) as active substances. Some solutions have been used in order to reduce the decrease in battery capacity due to irreversible capacity of the battery during the first charge-discharge process.

One solution in the prior art is that a surface of a lithium ribbon is coated with a release agent on line by means of a coating roller, so that the pressed and thinned lithium ribbon adheres to a calendering roller, the electrode sheet passes through the calendering roller, and the thinned lithium ribbon on a surface of the calendering roller is directly transferred to a surface of the electrode sheet, so as to compensate the loss of the lithium in the first charge-discharge process. In the method, two surfaces of the lithium ribbon are simultaneously coated with the release agent on line, which has extremely high requirements for the consistency of thickness of the lithium ribbon. In addition, a coating mechanism for providing the lithium ribbon release agent is coupled with the rolling of two coating rollers, causing equipment integration to be complicated, and provision of the release agent to be inflexible and uncontrollable.

SUMMARY

In view of the problems existing in the background art, the objective of the application is to provide a device for supplementing an electrode sheet with lithium and a method for supplementing the electrode sheet with the lithium, which can reduce requirements for the thickness consistency of a lithium ribbon, and makes a release agent be provided more flexibly, more controllably and more easily.

For achieving the objective mentioned above, the application provides the device for supplementing the electrode sheet with the lithium. The device for supplementing the electrode sheet with the lithium includes two first rolling wheels, a second rolling wheel, a lithium ribbon providing mechanism, a first transfer film conveying mechanism, a second transfer film conveying mechanism and an electrode sheet providing mechanism, wherein the two first rolling wheels are opposite to each other, and the second rolling wheel is adjacent to the first rolling wheel; the lithium ribbon providing mechanism is located upstream from the second rolling wheel and the first rolling wheel adjacent to the second rolling wheel, and the lithium ribbon providing mechanism is used for feeding a lithium ribbon f between the second rolling wheel and the first rolling wheel adjacent to the second rolling wheel; the first transfer film conveying mechanism is located upstream from the second rolling wheel and the first rolling wheel adjacent to the second rolling wheel, and the first transfer film conveying mechanism is used for conveying a first transfer film carrying a first release agent and transferring the first release agent to a first surface of the lithium ribbon; the second transfer film conveying mechanism is located upstream from the second rolling wheel and the first rolling wheel adjacent to the second rolling wheel, and the second transfer film conveying mechanism is used for conveying a second transfer film carrying a second release agent and transferring the second release agent to a second surface of the lithium ribbon; the electrode sheet providing mechanism is located upstream from the two first rolling wheels, and the electrode sheet providing mechanism is used for providing the electrode sheet between the two first rolling wheels, the second rolling wheel and the first rolling wheel adjacent thereto being used for pressing the lithium ribbon with the first release agent and the second release agent transferred on the first surface and the second surface respectively, thereby pressing the lithium ribbon into a lithium foil and making the lithium foil adhere to the first rolling wheel adjacent to the second rolling wheel; and the two first rolling wheels are used for rolling the first release agent, the lithium foil and the electrode sheet that enter the space between the two first rolling wheels, thereby making the lithium foil adhere to the electrode sheet to form a lithium supplemented electrode sheet.

The application further provides a method for supplementing an electrode sheet with lithium, the method comprising the following steps: providing an electrode sheet and a lithium ribbon; transferring first release agent to a first surface of the lithium ribbon; transferring second release agent to a second surface of the lithium ribbon; rolling the lithium ribbon with the first release agent and second release agent transferred to form a lithium foil; and pressing the lithium foil on at least one surface of the electrode sheet to form a lithium supplemented electrode sheet.

The application has the beneficial effects as follows: the first release agent is provided for the first surface of the lithium ribbon by means of the first transfer film carrying the first release agent, and the second release agent is provided for the second surface of the lithium ribbon by means of the second transfer film carrying the second release agent, such that when the first release agent and the second release agent are provided (whether in an off-line pre-curing mode or an on-line coating mode), complex equipment integration caused by coupling of a coating mechanism providing the lithium ribbon release agent and rolling of two coating rollers in the background art is avoided, and requirements for the thickness consistency of the incoming lithium ribbon is reduced, thereby making the first release agent and the second release agent be provided more flexibly, more controllably and more easily (even if the first release agent is arranged on the first transfer film and the second release agent is arranged on the second transfer film).

DETAILED DESCRIPTION OF THE EMBODIMENTS

The accompanying drawings illustrate embodiments herein, and it is to be understood that the disclosed embodiments are merely examples herein and that the application may be implemented in various forms, and therefore, specific details disclosed herein are not to be interpreted as limiting, but merely regarded as a basis for the claims and as an illustrative basis for teaching those of ordinary skill in the art to implement the application in various ways.

Furthermore, expressions of up, down, left, right, front, rear, etc. for illustrating indication directions of operation and structure of members in the embodiments are not absolute but relative, and although these indications are appropriate when the members are in positions shown in figures, these directions should be interpreted differently when these positions change, so as to correspond to the change.

Figure 1:
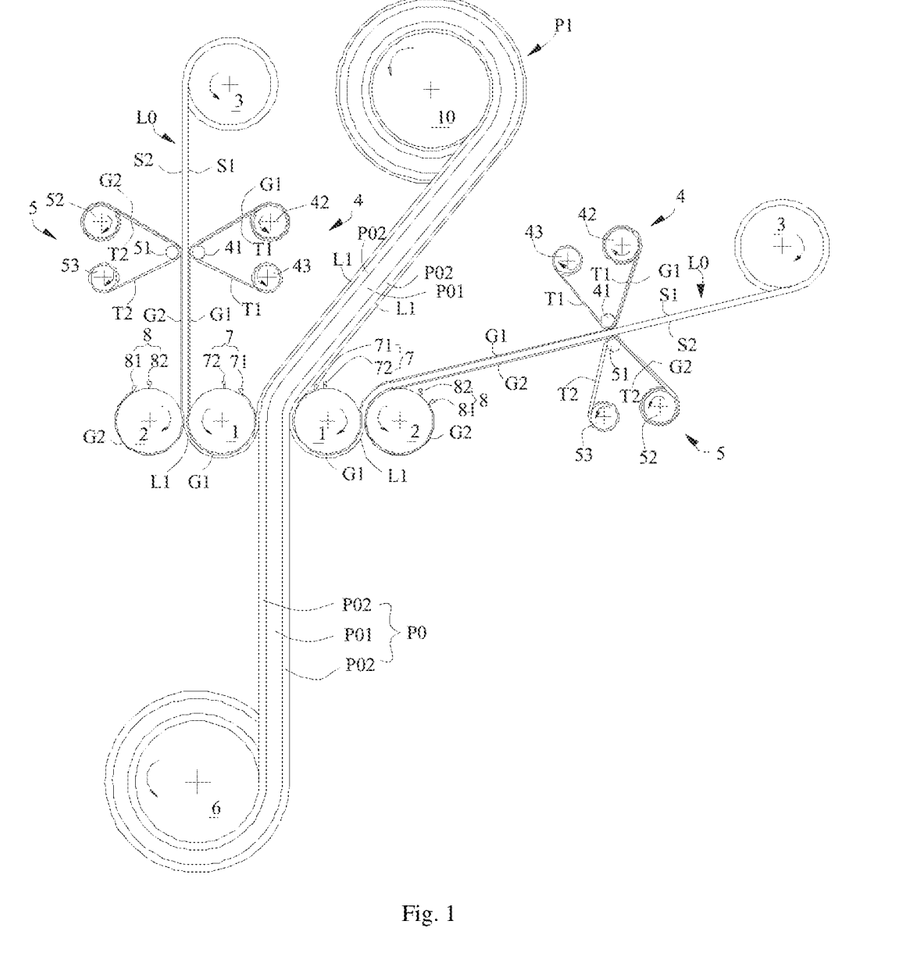
FIG. 1 is a schematic diagram of a first embodiment of a device for supplementing electrode sheet with lithium according to the application.

FIG. 1 is a schematic diagram of a first embodiment of a device for supplementing an electrode sheet with lithium according to the application.

In the first embodiment, the device for supplementing the electrode sheet with the lithium includes two first rolling wheels 1, a second rolling wheel 2, a lithium ribbon providing mechanism 3, a first transfer film conveying mechanism 4, a second transfer film conveying mechanism 5, and an electrode sheet providing mechanism 6. According to the actual situation, the device for supplementing the electrode sheet with the lithium may further include two first clearing assemblies 7, each first clearing assembly 7 being used for cleaning a surface of each first rolling wheel 1. According to the actual situation, the device for supplementing the electrode sheet with the lithium may further include a second clearing assembly 8, the second clearing assembly 8 being used for cleaning a surface of the second rolling wheel 2. According to the actual situation, the device for supplementing the electrode sheet with the lithium may further include a lithium supplemented electrode sheet collection mechanism 10.

The two first rolling wheels 1 are opposite each other. The second rolling wheel 2 is adjacent to the first rolling wheel 1.

The lithium ribbon providing mechanism 3 is located upstream from the second rolling wheel 2 and the first rolling wheel 1 adjacent to the second rolling wheel 2. The lithium ribbon providing mechanism 3 is used for feeding a lithium ribbon L0 between the second rolling wheel 2 and the first rolling wheel 1 adjacent to the second rolling wheel 2. In FIG. 1, the lithium ribbon providing mechanism 3 is a roller.

The first transfer film conveying mechanism 4 is located upstream from the second rolling wheel 2 and the first rolling wheel 1 adjacent to the second rolling wheel 2.

The first transfer film conveying mechanism 4 is used for conveying a first transfer film T1 carrying a first release agent G1 and transferring the first release agent G1 to a first surface S1 of the lithium ribbon L0. The second transfer film conveying mechanism 5 is located upstream from the second rolling wheel 2 and the first rolling wheel 1 adjacent to the second rolling wheel 2. The second transfer film conveying mechanism 5 is used for conveying a second transfer film T2 carrying a second release agent G2 and transferring the second release agent G2 to a second surface S2 of the lithium ribbon L0. A surface roughness of the first release agent G1 is greater than that of the second release agent G2. The first release agent G1 is continuously distributed on the first transfer film T1 carrying the first release agent G1, in other words, in FIG. 1, the first release agent G1 is continuously distributed on the first transfer film T1 in the longitudinal direction of the first transfer film T1 before the first release agent G1 is transferred to the first surface S1 of the lithium ribbon L0; and the second release agent G2 is continuously distributed on the second transfer film T2 carrying the second release agent G2, in other words, in FIG. 1, the second release agent G2 is continuously distributed on the second transfer film T2 in the longitudinal direction of the second transfer film T2 before the second release agent G2 is transferred onto the second surface S2 of the lithium ribbon L0. In the first embodiment shown in FIG. 1, the first release agent G1 is pre-cured on the first transfer film T1; and the second release agent G2 is pre-cured on the second transfer film T2, such that the first release agent G1 and the second release agent G2 can be provided more easily in comparison with the release agent on-line coating in the background art, the component integration difficulty and compatibility of the device for supplementing the electrode sheet with the lithium are reduced, the number of components is reduced, and the operation is simplified.

The first transfer film conveying mechanism 4 comprises a first roller 41. The first transfer film conveying mechanism 4 may further comprise a first transfer film unwinding mechanism 42 and a first transfer film winding mechanism 43. The first transfer film unwinding mechanism 42 is used for unwinding the first transfer film T1; and the first transfer film winding mechanism 43 is used for winding the first transfer film T1. In FIG. 1, both the first transfer film unwinding mechanism 42 and the first transfer film winding mechanism 43 are rollers.

The second transfer film conveying mechanism 5 comprises a second roller 51. The second transfer film conveying mechanism 5 further comprises a second transfer film unwinding mechanism 52 and a second transfer film winding mechanism 53. The second transfer film unwinding mechanism 52 is used for unwinding the second transfer film T2, and the second transfer film winding mechanism 53 is used for winding the second transfer film T2. In FIG. 1, both the second transfer film unwinding mechanism 52 and the second transfer film winding mechanism 53 are rollers.

The second roller 51 of the second transfer film conveying mechanism 5 is opposite the first roller 41 of the first transfer film conveying mechanism 4. Therefore, the first roller 41 and the second roller 51 are used for rolling the first transfer film T1 carrying the first release agent G1, the lithium ribbon L0 provided by the lithium ribbon providing mechanism 3 and the second transfer film T2 carrying the second release agent G2 so as to transfer the first release agent G1 and the second release agent G2 to the first surface S1 and the second surface S2 of the lithium ribbon L0 respectively. By means of the rolling function of the first roller 41 and the second roller 51, the uniformity of the first release agent G1 and the second release agent G2 transferred to the first surface S1 and the second surface S2 of the lithium ribbon L0 respectively is improved. In FIG. 1, the first roller 41 and the second roller 51 are used for making the first release agent G1 and the second release agent G2 continuously adhere to the first surface S1 and the second surface S2 of the lithium ribbon L0 respectively.

In one embodiment, the first roller 41 is a hot roller. Likewise, the second roller 51 may also be a hot roller. The first roller 41 and/or the second roller 51 are/is the hot rollers/hot roller, which can reduce a roller pressure between the first roller 41 and the second roller 51, such that the first release agent G1 on the first transfer film T1 can be more easily transferred to the first surface S1 of the lithium ribbon L0 and/or the second release agent G2 on the second transfer film T2 can be more easily transferred to the second surface S2 of the lithium ribbon L0, that is, the efficiency in a transfer process of the release agent is improved, damage to the first transfer film T1 and the second transfer film T2 is reduced, and then the first transfer film T1 and the second transfer film T2 can be repeatedly used.

The electrode sheet providing mechanism 6 is located upstream from the two first rolling wheels 1. The electrode sheet providing mechanism 6 is used for providing an electrode sheet P0 between the two first rolling wheels 1. The electrode sheet P0 comprises a current collector P01 and an active substance layer P02 arranged on a surface of the current collector P01. The distribution of the first release agent G1 corresponds to the distribution of the active substance layer P02, and the active substance layer P02 of the electrode sheet P0 is continuously distributed on the current collector P01. In other words, that is, the first release agent G1 is also continuously distributed.

The second rolling wheel 2 and the first rolling wheel 1 adjacent thereto are used for pressing the lithium ribbon L0 with the first release agent G1 and the second release agent G2 transferred on the first surface S1 and the second surface S2 respectively, thereby pressing the lithium ribbon L0 into a lithium foil L1 and making the lithium foil L1 adhere to the first rolling wheel 1 adjacent to the second rolling wheel 2 by means of the first release agent G1. Specifically, when the second rolling wheel 2 and the first rolling wheel 1 adjacent thereto are used for pressing the lithium ribbon L0 with the first release agent G1 and the second release agent G2 transferred on the first surface S1 and the second surface S2 respectively, due to the fact that the surface roughness of the first release agent G1 is greater than that of the second release agent G2, the pressed lithium foil L1 adheres to the first rolling wheel 1 adjacent to the second rolling wheel 2 by means of the first release agent G1.

The two first rolling wheels 1 are used for rolling the first release agent G1, the lithium foil L1 and the electrode sheet P0 that enter the space between the two first rolling wheels 1, thereby making the lithium foil L1 adhere to the electrode sheet P0 (specifically the active substance layer P02) to form a lithium supplemented electrode sheet P1. Specifically, the surface roughness of the active substance layer P02 of the electrode sheet P0 is greater than that of the first release agent G1, such that the adhesive force between the lithium foil L1 and the active substance layer P02 is greater than that between the lithium foil L1 and the first release agent G1, when the electrode sheet P0 passes a space between the two first rolling wheels 1, the lithium foil L1 is stripped from the corresponding first rolling wheel 1 under the traction of the electrode sheet P0, and then the lithium foil L1 adheres to the active substance layer P02 of the electrode sheet P0 to form the lithium supplemented electrode sheet P1.

Each first clearing assembly 7 comprises a first scraper 71. According to the actual situation, each first clearing assembly 7 further comprises a first cleaning device 72. A cutting edge of the first scraper 71 is attached to a surface of the corresponding first rolling wheel 1. Preferably, an obtuse angle is formed between the cutting edge of the first scraper 71 and a tangent line of the corresponding first rolling wheel 1 in a rotating direction of the corresponding first rolling wheel 1. The first scraper 71 is used for scraping off the first release agent G1 and lithium scraps L2 on the surface of the corresponding first rolling wheel 1, and the first cleaning device 72 is located behind the first scraper 71 in the rotating direction of the corresponding first rolling wheel 1 and used for cleaning a scraped surface of the first scraper 71 corresponding to the first rolling wheel 1. The first cleaning device 72, for example, can suck scraps (the first release agent G1 and the lithium scraps L2) scraped off by the first scraper 71 by using negative pressure, and can also be used for spraying high-temperature gas to the surface of the corresponding first rolling wheel 1, and the high-temperature gas quickly volatilizes the residual first release agent G1, such that the cleanness of the corresponding first rolling wheel 1 is further ensured.

The second clearing assembly 8 comprises a second scraper 81. According to the actual situation, the second clearing assembly 8 may further comprise a second cleaning device 82. A cutting edge of the second scraper 81 is attached to a surface of the second rolling wheel 2. Preferably, an obtuse angle is formed between the cutting edge of the second scraper 81 and a tangent line of the second rolling wheel 2 in a rotating direction of the second rolling wheel 2. The second scraper 81 is used for scraping off the second release agent G2 on the surface of the corresponding second rolling wheel 2. The second cleaning device 82 is located behind the second scraper 81 in the rotating direction of the second rolling wheel 2 and used for cleaning a scraped surface of the second scraper 81 corresponding to the second rolling wheel 2. Similarly, the second cleaning device 82, for example, can suck the second release agent G2 scraped off by the second scraper 81 by using the negative pressure, and can also be used for spraying the high-temperature gas to the surface of the second rolling wheel 2, and the high-temperature gas quickly volatilizes the residual second release agent G2 on the second rolling wheel 2, such that the cleanness of the second rolling wheel 2 is further ensured.

The lithium supplemented electrode sheet collection mechanism 10 is located downstream from the two first rolling wheels 1. The lithium supplemented electrode sheet collection mechanism 10 is used for collecting the lithium supplemented electrode sheet P1. In FIG. 1, the lithium supplemented electrode sheet collection mechanism 10 is a roller.

The second rolling wheel 2, the lithium ribbon providing mechanism 3, the first transfer film conveying mechanism 4 and the second transfer film conveying mechanism 5 are correspondingly arranged in one or two sets on the basis that the active substance layer/layers P02 is/are arranged on one or two surfaces of the current collector P01. In other words, when the active substance layer P02 is arranged on one surface of the current collector P01, the second rolling wheel 2, the lithium ribbon providing mechanism 3, the first transfer film conveying mechanism 4, and the second transfer film conveying mechanism 5 are arranged in one set, that is, arranged on the left side of the two first rolling wheels 1 or the right side of the two first rolling wheels 1, thereby supplementing one surface of the electrode sheet P0 with the lithium; and when the active substance layers P02 are arranged on the two surfaces of the current collector P01, the two second rolling wheels 2, the two lithium ribbon providing mechanisms 3, the two first transfer film conveying mechanisms 4 and the two second transfer film conveying mechanisms 5 are arranged as shown in FIG. 1, thereby supplementing two surfaces of the electrode sheet P0 with the lithium.

It is to be noted that in the first embodiment shown in FIG. 1, the two first rolling wheels 1 constitute a first rolling wheel pair, and the second rolling wheel 2 and the adjacent first rolling wheel constitute a second rolling wheel pair. The second rolling wheel pair and the first rolling wheel pair share one corresponding first rolling wheel. The second rolling wheel 2 is located on a side of a connection line formed by a rolling inlet and a rolling outlet of the first rolling wheel pair, in other words, the second rolling wheel 2 is located on a side of a connection line (namely a pressing process line) formed by the electrode sheet P0 and the lithium supplemented electrode sheet P1. In FIG. 1, centers of the second rolling wheel 2 and the two first rolling wheels 1 are on the same straight line, but are not limited thereto, as long as the pressing function of the above mentioned second rolling wheel pair, the adhesion of the lithium foil L1 to the corresponding first rolling wheel 1, the calendering of the first rolling wheel pair and the adhesion of the lithium foil L1 to the active substance layer P02 of the electrode sheet P0 can be satisfied.

The first embodiment of the device for supplementing the electrode sheet with the lithium in FIG. 1 achieves continuous lithium supplement on the electrode sheet P0.

Figure 2:
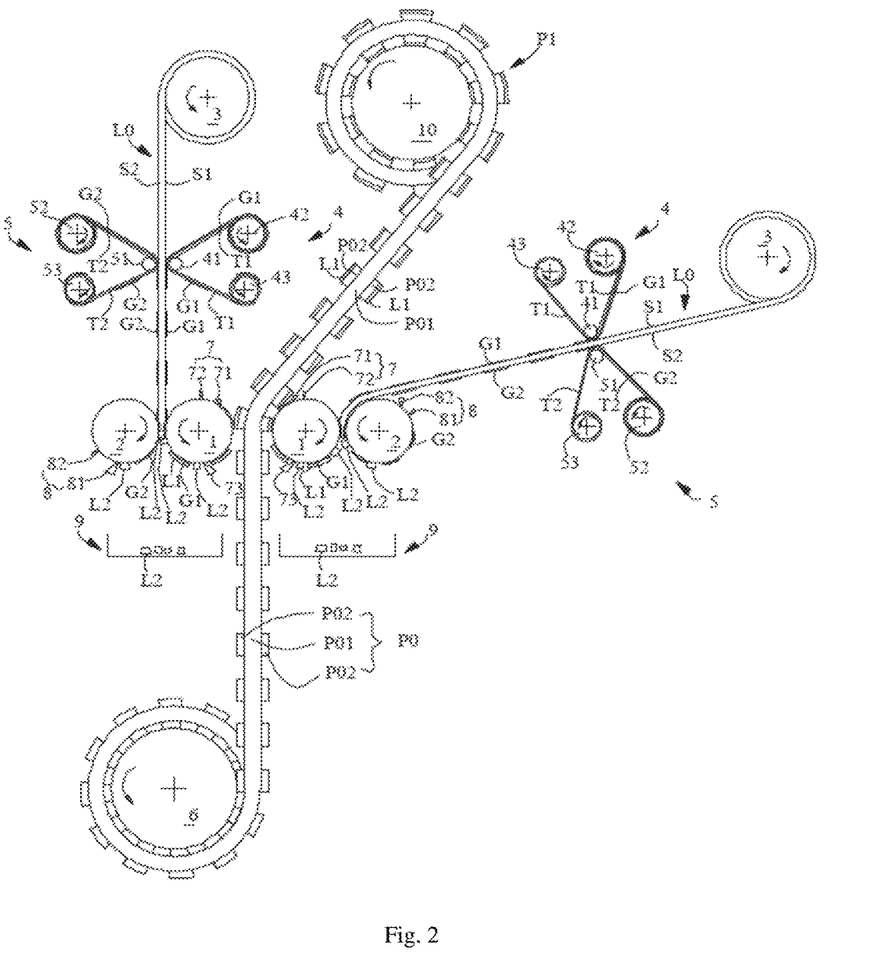
FIG. 2 is a schematic diagram of a second embodiment of the device for supplementing electrode sheet with the lithium according to the application.

FIG. 2 is a schematic diagram of a second embodiment of the device for supplementing the electrode sheet with the lithium according to the application. It is to be noted that a component having the same structure as a component of the first embodiment is indicated by the same reference number, with the description of the same omitted. Further description of the same acts and functions as the first embodiment will be omitted.

It is different from the first embodiment of the device for supplementing the electrode sheet with the lithium in the FIG. 1 that in the second embodiment, a gap between the first roller 41 and the second roller 51 is adjustable, such that the first release agent G1 and the second release agent G2 can discontinuously adhere to the first surface S1 and the second surface S2 of the lithium ribbon L0 respectively. The active substance layer P02 of the electrode sheet P0 is discontinuously distributed on the current collector P01 (that is, the part, without the active substance layer P02, of the surface of the current collector P01 is a blank current collector region), and the first release agent G1 corresponds to the active substance layer P02 one to one; each first clearing assembly 7 further includes a first auxiliary cutter 73, the first auxiliary cutters 73 are arranged in front of inlets formed by the two first rolling wheels 1 and used for clearing the lithium scraps L2 which are located between the lithium foils L1 discontinuously adhering to the surfaces of the first rolling wheels 1, located in front of a pressing inlet and formed by the lithium foils L1, so as to prevent the lithium scraps L2 from adhering to the electrode sheet P0, such that the lithium supplement precision is improved; and the device for supplementing the electrode sheet with the lithium further includes a collection tank 9, and the collection tank 9 is located below the second rolling wheel 2 and the corresponding first rolling wheel 1 and used for collecting the lithium scraps L2 removed by the first auxiliary cutter 73 and the lithium scraps L2 formed by the lithium foil L1 and falling from the space between the second rolling wheel 2 and the corresponding first rolling wheel 1.

The second embodiment of the device for supplementing the electrode sheet with the lithium in FIG. 2 achieves intermittent lithium supplement on the electrode sheet P0, and it is to be noted that the part, without the active substance layer P02, of the surface of the current collector P01 is the blank current collector region.

Figure 3:
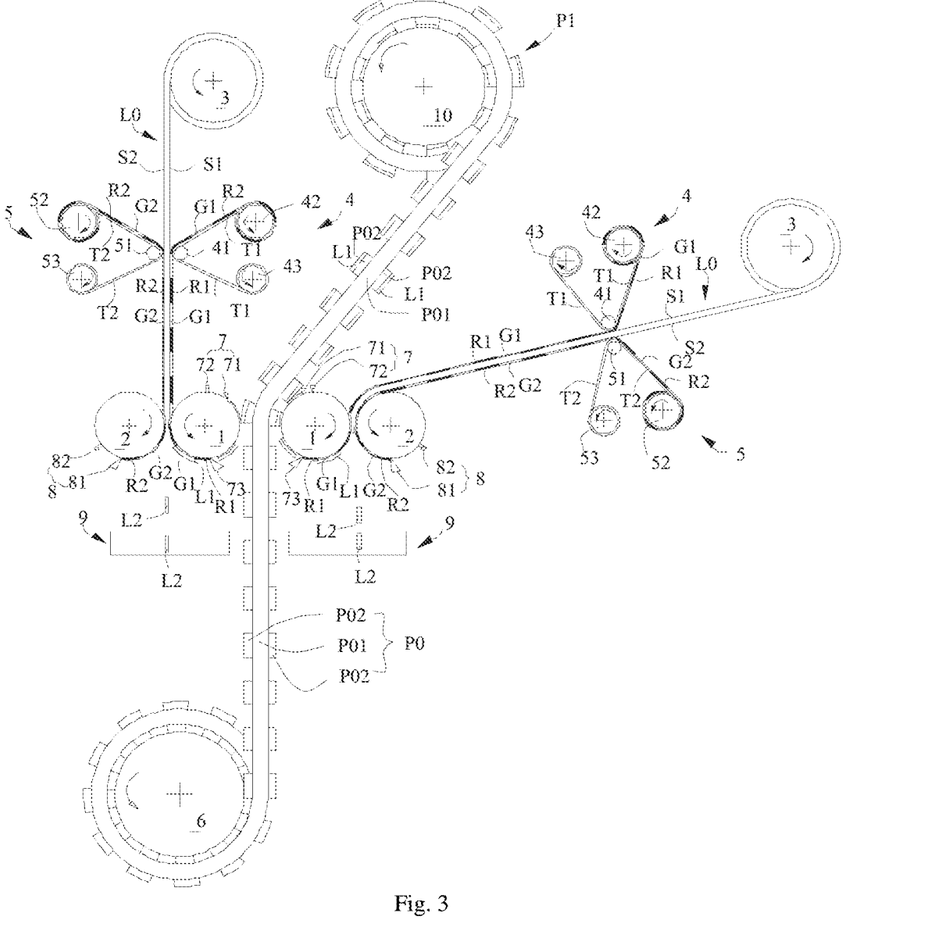
FIG. 3 is a schematic diagram of a third embodiment of the device for supplementing electrode sheet with lithium according to the application.

FIG. 3 is a schematic diagram of a third embodiment of the device for supplementing the electrode sheet with the lithium according to the application. It is to be noted that a component having the same structure as a component of the second embodiment is indicated by the same reference number, with the description of the same omitted. Further description of the same acts and functions as the second embodiment will be omitted.

It is different from the second embodiment of the device for supplementing the electrode sheet with the lithium in FIG. 2 that in the third embodiment, the first transfer film T1 carrying the first release agent G1 also carries a first lubricant R1, and the first lubricant R1 and the first release agent G1 are alternately arranged; the second transfer film T2 carrying the second release agent G2 also carries a second lubricant R2, and the second lubricant R2 and the second release agent G2 are alternately arranged; the first lubricant R1 is prearranged on the first transfer film T1; the second lubricant R2 is prearranged on the second transfer film T2; the first release agent G1 and the first lubricant R1 arranged alternatively adhere to the first surface S1 of the lithium ribbon L0; the second release agent G2 and the second lubricant R2 arranged alternatively adhere to the second surface S2 of the lithium ribbon L0; and the active substance layer P02 of the electrode sheet P0 is discontinuously distributed on the current collector P01, and the first release agent G1 corresponds to the active substance layer P02 one to one.

The third embodiment of the device for supplementing the electrode sheet with the lithium in FIG. 3 achieves intermittent lithium supplement on the electrode sheet P0.

Figure 4:
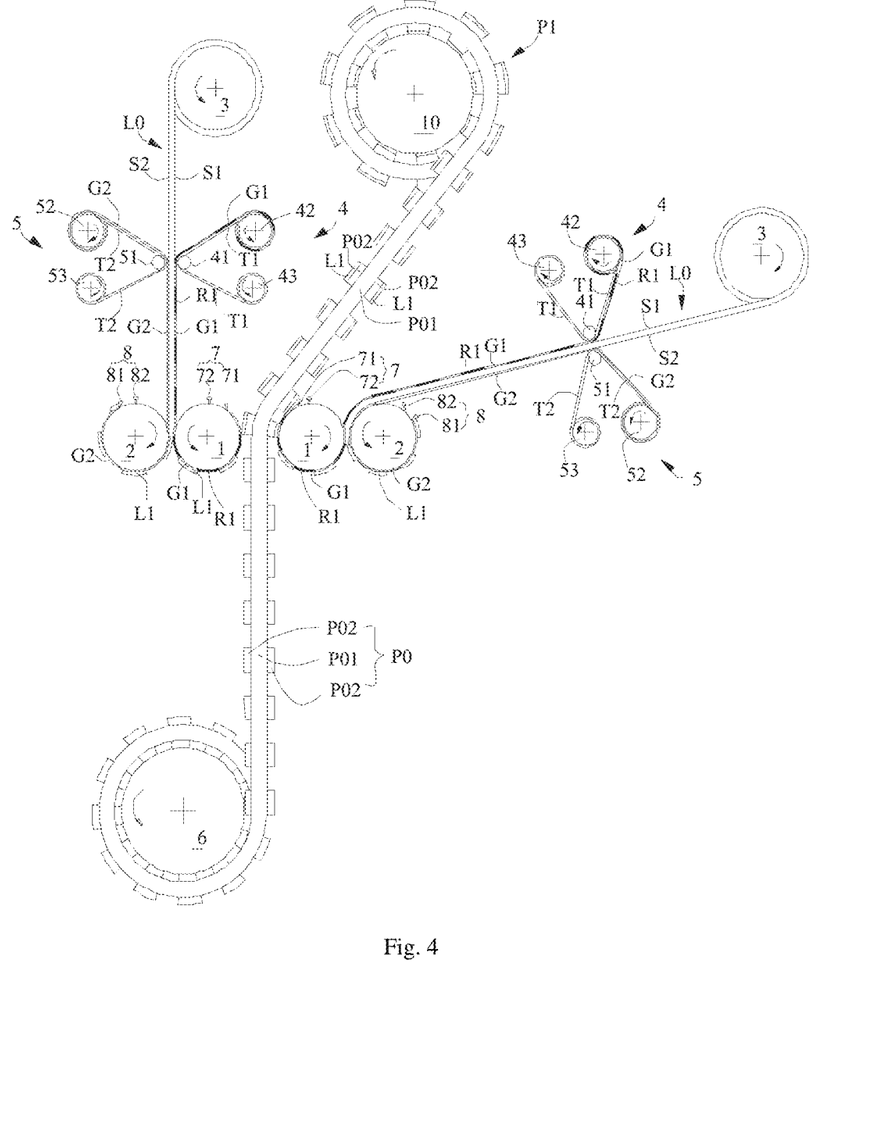
FIG. 4 is a schematic diagram of a fourth embodiment of the device for supplementing electrode sheet with lithium according to the application.

FIG. 4 is a schematic diagram of a fourth embodiment of the device for supplementing the electrode sheet with the lithium according to the application. It is to be noted that a component having the same structure as a component of the second embodiment is indicated by the same reference number, with the description of the same omitted. Further description of the same acts and functions as the second embodiment will be omitted.

It is different from the second embodiment of the device for supplementing the electrode sheet with the lithium in FIG. 3 that in the fourth embodiment, the first transfer film T1 carrying the first release agent G1 also carries a first lubricant R1, and the first lubricant R1 and the first release agent G1 are alternately arranged; on the second transfer film T2 carrying the second release agent G2, the second release agent G2 is continuously distributed on the second transfer film T2; the first release agent G1 and the first lubricant R1 arranged alternatively adhere to the first surface S1 of the lithium ribbon L0; the second release agent G2 continuously adheres to the second surface S2 of the lithium ribbon L0; and the active substance layer P02 of the electrode sheet P0 is discontinuously distributed on the current collector P01, and the first release agent G1 corresponds to the active substance layer P02 one to one.

The fourth embodiment of the device for supplementing the electrode sheet with the lithium in FIG. 4 achieves intermittent lithium supplement on the electrode sheet P0.

Figure 5:
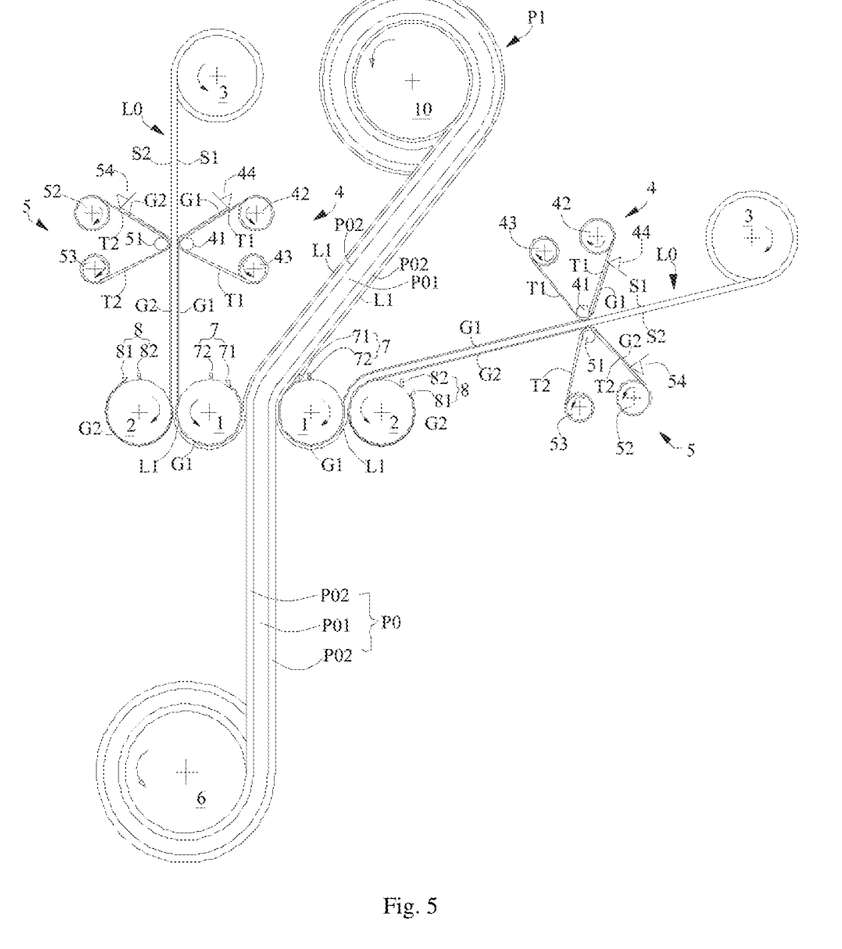
FIG. 5 is a schematic diagram of a fifth embodiment of the device for supplementing electrode sheet with lithium according to the application.

It is different from the first embodiment of the device for supplementing the electrode sheet with the lithium in FIG. 1 that in the fifth embodiment, the first transfer film conveying mechanism 4 further includes a first release agent coating mechanism 44, and the first release agent coating mechanism 44 is used for coating the first transfer film T1 with the first release agent G1; and the second transfer film conveying mechanism 5 further includes a second release agent coating mechanism 54, and the second release agent coating mechanism 54 is used for coating the second transfer film T2 with the second release agent G2.

Figure 6:
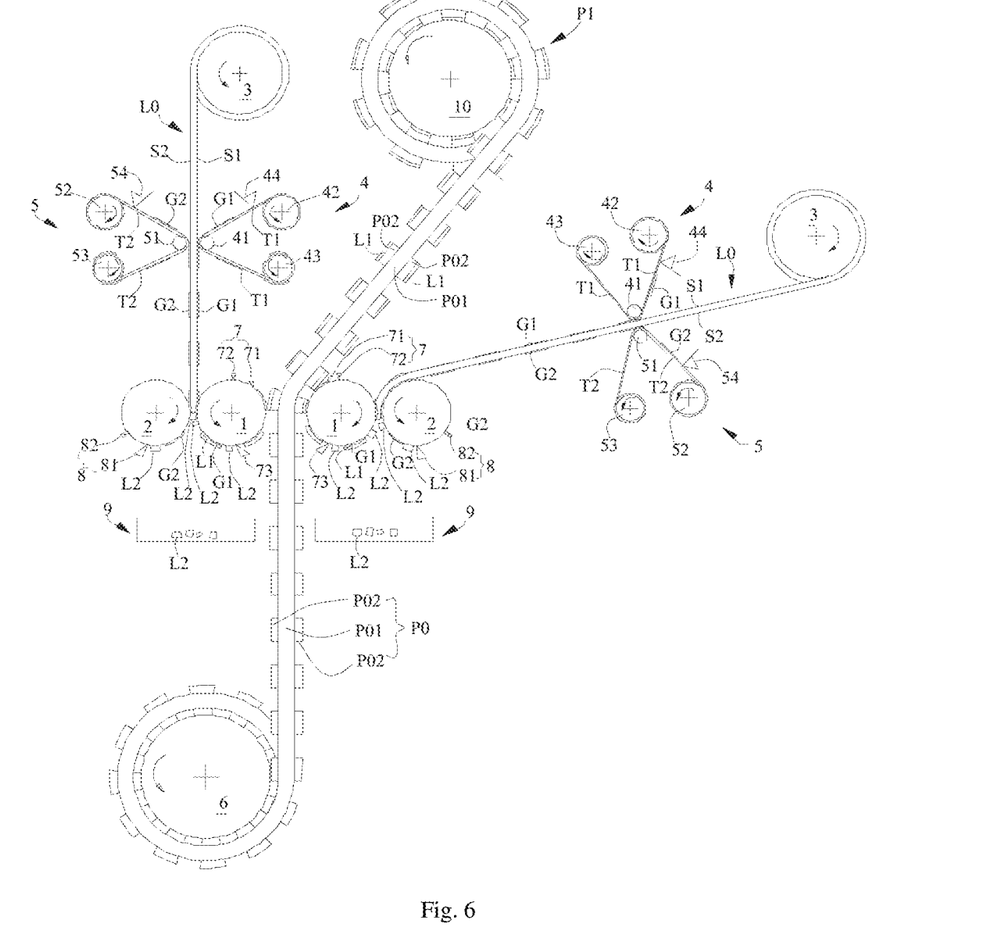
FIG. 6 is a schematic diagram of a sixth embodiment of the device for supplementing electrode sheet with lithium according to the application.

FIG. 6 is a schematic diagram of a sixth embodiment of the device for supplementing the electrode sheet with the lithium according to the application. Like the second embodiment of the device for supplementing the electrode sheet with the lithium in FIG. 2, the sixth embodiment of the device for supplementing the electrode sheet with the lithium in FIG. 6 achieves discontinuous lithium supplement on the electrode sheet P0. It is to be noted that a component having the same structure as a component of the second embodiment shown in FIG. 2 is indicated by the same reference number, with the description of the same omitted. Further description of the same acts and functions as the second embodiment will be omitted.

It is different from the second embodiment of the device for supplementing the electrode sheet with the lithium in FIG. 2 that in the sixth embodiment, the first transfer film conveying mechanism 4 further includes a first release agent coating mechanism 44, and the first release agent coating mechanism 44 is used for coating the first transfer film T1 with the first release agent G1; and the second transfer film conveying mechanism 5 further includes a second release agent coating mechanism 54, and the second release agent coating mechanism 54 is used for coating the second transfer film T2 with the second release agent G2.

Figure 7:
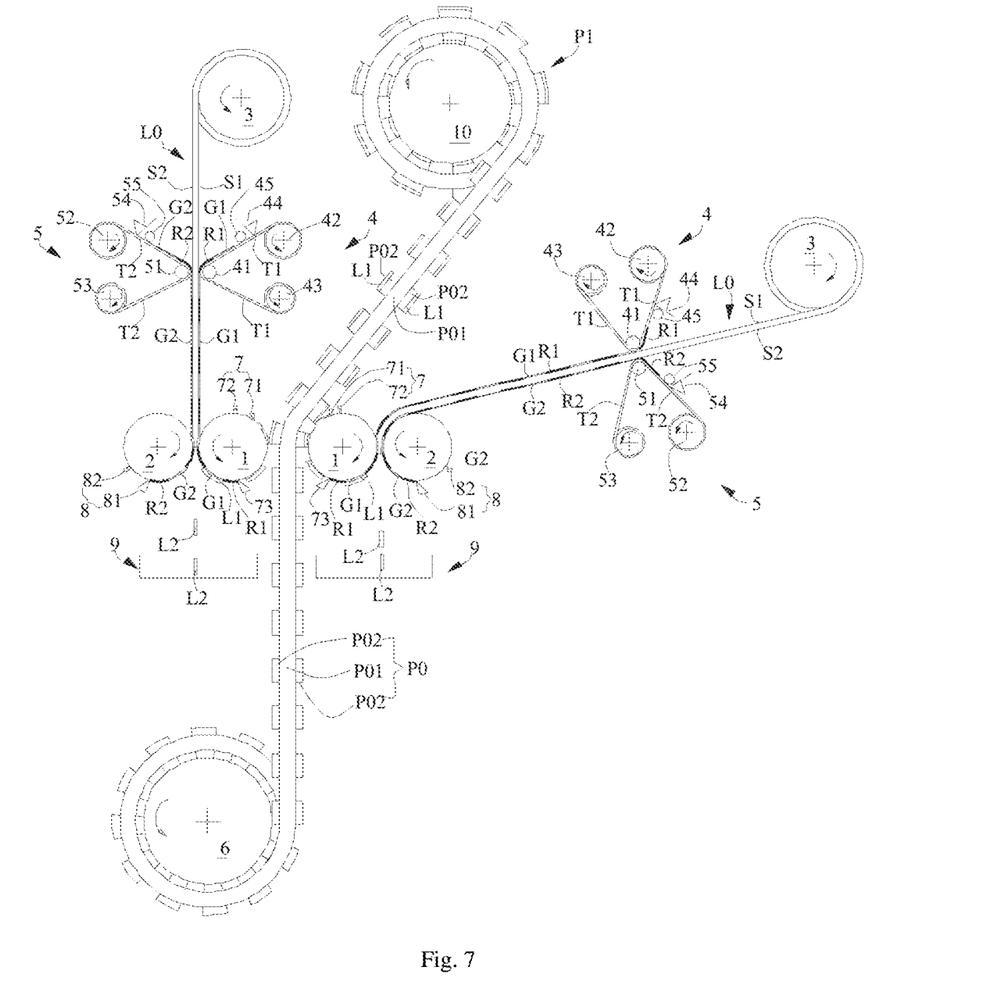
FIG. 7 is a schematic diagram of a seventh embodiment of the device for supplementing electrode sheet with lithium according to the application.

FIG. 7 is a schematic diagram of a seventh embodiment of the device for supplementing the electrode sheet with the lithium according to the application. Like the third embodiment of the device for supplementing the electrode sheet with the lithium in FIG. 3, the seventh embodiment of the device for supplementing the electrode sheet with the lithium in FIG. 7 achieves discontinuous lithium supplement on the electrode sheet P0. It is to be noted that a component having the same structure as a component of the third embodiment shown in FIG. 3 is indicated by the same reference number, with the description of the same omitted. Further description of the same acts and functions as the third embodiment will be omitted.

It is different from the third embodiment of the device for supplementing the electrode sheet with the lithium in FIG. 3 that in the seventh embodiment, the first transfer film conveying mechanism 4 further includes a first release agent coating mechanism 44, and the first release agent coating mechanism 44 is used for coating the first transfer film T1 with the first release agent G1; the second transfer film conveying mechanism 5 further includes a second release agent coating mechanism 54, and the second release agent coating mechanism 54 is used for coating the second transfer film T2 with the second release agent G2; the first transfer film conveying mechanism 4 further includes a first lubricant coating mechanism 45, and the first lubricant coating mechanism 45 is used for coating the first transfer film T1 with the first lubricant R1; and the second transfer film conveying mechanism 5 further includes a second lubricant coating mechanism 55, and the second lubricant coating mechanism 55 is used for coating the second transfer film T2 with the second lubricant R2.

Figure 8:
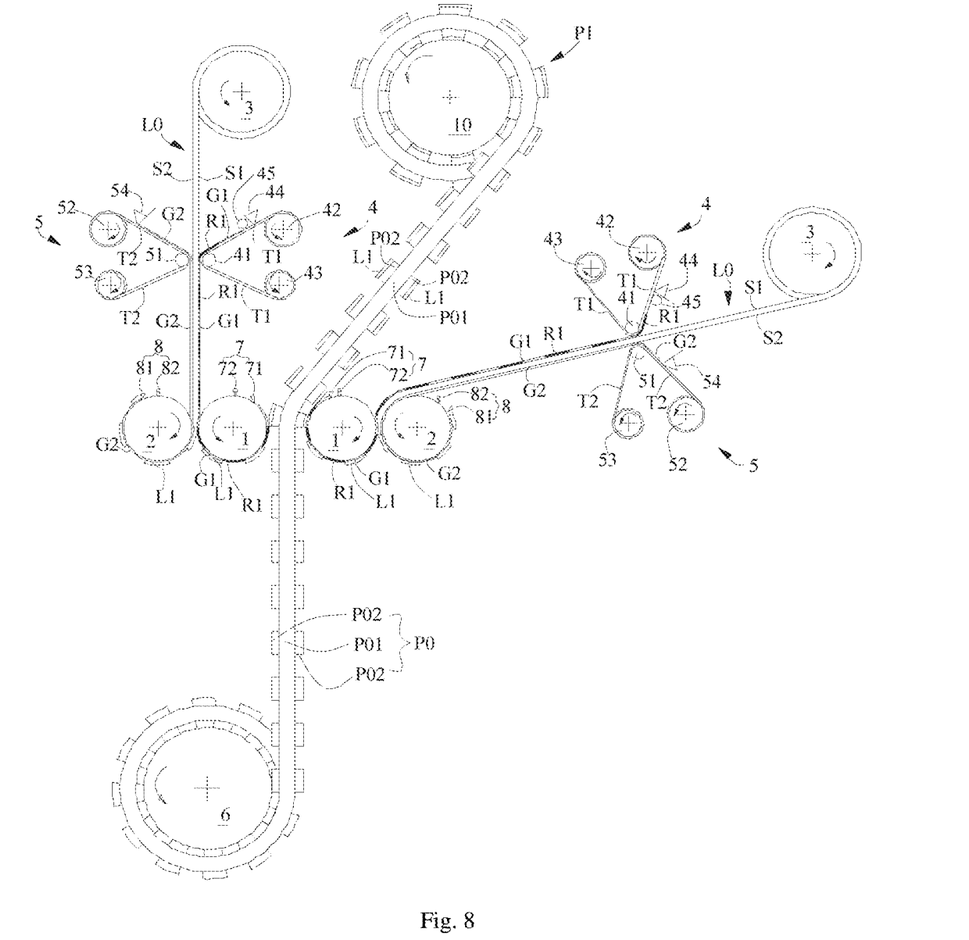
FIG. 8 is a schematic diagram of an eighth embodiment of the device for supplementing electrode sheet with lithium according to the application.

FIG. 8 is a schematic diagram of an eighth embodiment of the device for supplementing the electrode sheet with the lithium according to the application. Like the fourth embodiment of the device for supplementing the electrode sheet with the lithium in FIG. 4, the eighth embodiment of the device for supplementing the electrode sheet with the lithium in FIG. 8 achieves discontinuous lithium supplement on the electrode sheet P0. It is to be noted that a component having the same structure as a component of the fourth embodiment shown in FIG. 4 is indicated by the same reference number, with the description of the same omitted. Further description of the same acts and functions as the fourth embodiment will be omitted.

Different from the fourth embodiment of the device for supplementing electrode sheet with lithium in FIG. 4, in the eighth embodiment, the first transfer film conveying mechanism 4 further includes a first release agent coating mechanism 44, and the first release agent coating mechanism 44 is used for coating the first transfer film T1 with the first release agent G1; the first transfer film conveying mechanism 4 further includes a first lubricant coating mechanism 45, and the first lubricant coating mechanism 45 is used for coating the first transfer film T1 with the first lubricant R1; and the second transfer film conveying mechanism 5 further includes a second release agent coating mechanism 54, and the second release agent coating mechanism 54 is used for coating the second transfer film T2 with the second release agent G2.

It is to be noted that in the four embodiments of the device for supplementing the electrode sheet with the lithium in FIG. 5 to FIG. 8, the first transfer film T1 is coated with the first release agent G1 on line, and the second transfer film T2 is coated with the second release agent G2 on line; in the seventh embodiment of the device for supplementing the electrode sheet with the lithium in FIG. 7, the first transfer film T1 is coated with the first lubricant R1 on line, and the second transfer film T2 is coated with the second lubricant R2 on line; and in the eighth embodiment of the device for supplementing the electrode sheet with the lithium in FIG. 8, the first transfer film T1 is coated on the first lubricant R1 on line.

It is to be noted that in the four embodiments of the device for supplementing the electrode sheet with the lithium in FIG. 5 to FIG. 8, the coating mechanism used for coating may be a gravure coating mechanism M1, a transfer coating mechanism M2, or an extrusion coating mechanism M3.

Figure 9:
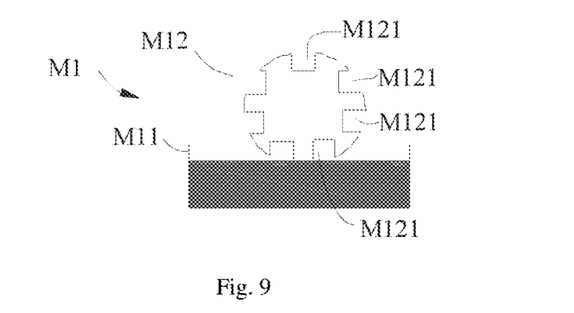
FIG. 9 is a schematic diagram of an embodiment of a coating mechanism of the device for supplementing the electrode sheet with the lithium according to the application.

FIG. 9 is a schematic diagram of an embodiment of the coating mechanism of the device for supplementing the electrode sheet with the lithium according to the application.

As shown in FIG. 9, the gravure coating mechanism M1 includes a accommodation groove M11 and a gravure roller M12, wherein the accommodation groove M11 is used for accommodating a corresponding lubricant or release agent, and the gravure roller M12 is adjacent to the corresponding transfer film (the first transfer film T1 or the second transfer film T2); and the gravure roller M12 has recesses M121 arranged at intervals in a circumferential direction and extending in the circumferential direction, and the gravure roll M12 is used for extracting, during rotation, the corresponding lubricant (the first lubricant R1 or the second lubricant R2) or release agent (the first release agent G1 or the second release agent G2) from the accommodation groove M11 by means of the recesses M121 and coating the corresponding surface of the corresponding transfer film with same.

Figure 10:
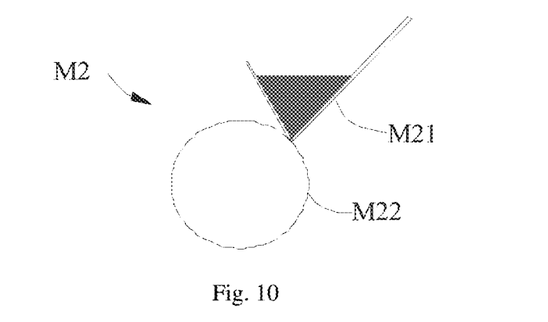
FIG. 10 is a schematic diagram of another embodiment of the coating mechanism of the device for supplementing the electrode sheet with the lithium according to the application.

FIG. 10 is a schematic diagram of another embodiment of the coating mechanism of the device for supplementing the electrode sheet with the lithium according to the application.

As shown in FIG. 10, the transfer coating mechanism M2 includes a scraper M21 and a transfer roller M22, wherein the scraper M21 is used for accommodating the corresponding lubricant or release agent and adjacent to the transfer roller M22, and the transfer roller M22 is adjacent to the corresponding transfer film (the first transfer film T1 or the second transfer film T2); and the scraper M21 is used for transferring the corresponding lubricant (the first lubricant R1 or the second lubricant R2) or release agent (the first release agent G1 or the second release agent G2) to a surface of the transfer roller M22, and the transfer roller M22 is used for making the corresponding lubricant or release agent transferred to the surface of transfer roller M22 make contact and coat the corresponding surface of the corresponding transfer film.

Figure 11:
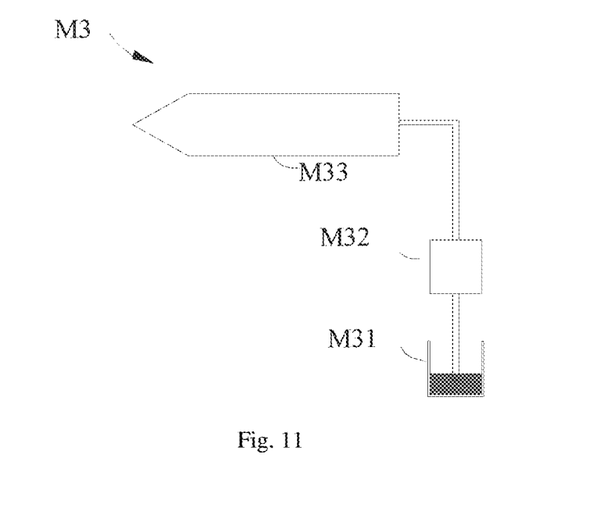
FIG. 11 is a schematic diagram of another embodiment of the coating mechanism of the device for supplementing the electrode sheet with the lithium according to the application.

FIG. 11 is a schematic diagram of yet another embodiment of the coating mechanism of the device for supplementing the electrode sheet with the lithium according to the application.

As shown in FIG. 11, the extrusion coating mechanism M3 includes an accommodation tank M31, a screw pump M32 and a coating head M33, wherein the accommodation tank M31 is used for accommodating the corresponding lubricant (the first lubricant R1 or the second lubricant R2) or release agent (the first release agent G1 or the second release agent G2), the corresponding lubricant or release agent is conveyed to the coating head M33 by means of the screw pump M32, and the coating head M33 is used for coating the corresponding transfer film (the first transfer film T1 or the second transfer film T2) with the corresponding lubricant or release agent.

In the eight embodiments shown in FIG. 1 to FIG. 8, the first release agent G1 is provided for the first surface S1 of the lithium ribbon L0 by means of the first transfer film T1 carrying the first release agent G1, and the second release agent G2 is provided for the second surface S2 of the lithium ribbon L0 by means of the second transfer film T2 carrying the second release agent G2, and the provision (whether in an off-line pre-curing mode or an on-line coating mode) of the first release agent G1 and the second release agent G2 is separated from rolling of the first roller 41 and the second roller 51, complex equipment integration caused by coupling of a coating mechanism for providing the lithium ribbon release agent and rolling of the two coating rollers and influence of rolling force of the two coating rollers for coating the release agent on the provision of the first release agent G1 and the second release agent G2 in the background art is avoided, and requirements on the thickness consistency of the incoming lithium ribbon is reduced, such that the first release agent G1 and the second release agent G2 are provided more flexibly, more controllably and more easily (even if the first release agent G1 is arranged on the first transfer film T1 and the second release agent G2 is arranged on the second transfer film T2). Furthermore, the first release agent G1 is provided for the first surface S1 of the lithium ribbon L0 by means of the first transfer film T1 carrying the first release agent G1, and the second release agent G2 is provided for the second surface S2 of the lithium ribbon L0 by means of the second transfer film T2 carrying the second release agent G2, such that the first roller 41 and the second roller 51 which apply the rolling can be spaced from the lithium ribbon L0, the first transfer film T1 and the second transfer film T2 play a role in transferring and buffering the rolling force, and the transmission is gentler than that when the first roller 41 and the second roller 51 directly transfer the first release agent G1 and the second release agent G2 to the lithium ribbon L0 respectively, such that the first release agent G1 and the second release agent G2 transferred to the lithium ribbon L0 are more uniform. Furthermore, the first release agent G1 is provided for the first surface S1 of the lithium ribbon L0 by means of the first transfer film T1 carrying the first release agent G1, the second release agent G2 is provided for the second surface S2 of the lithium ribbon L0 by means of the second transfer film T2 carrying the second release agent G2, rotation directions of the first roller 41 and the second roller 51 are consistent with an advancing direction of the lithium ribbon L0 provided by the lithium ribbon providing mechanism 3 (that is a forward direction), and in the background art, and the rotation directions of the first roller 41 and the second roller 51 are opposite the advancing direction of the lithium ribbon L0 provided by the lithium ribbon providing mechanism 3 (that is a reverse direction), such that compared with the background art, the transfer efficiency of the first release agent G1 and the second release agent G2 is improved.

The embodiment below introduces a method for supplementing electrode sheet with lithium provided by the application, and for the part not described in detail, reference may be made to the above-mentioned device for supplementing electrode sheet with lithium.

The method for supplementing electrode sheet with lithium provided by the application includes the following steps: providing the electrode sheet P0 and a lithium ribbon L0; transferring a first release agent G1 onto a first surface S1 of the lithium ribbon L0; transferring a second release agent G2 onto a second surface S2 of the lithium ribbon L0; rolling the lithium ribbon L0 with the transferred first release agent G1 and second release agent G2 to form a lithium foil L1; and pressing the lithium foil L1 on at least one surface of the electrode sheet P0 to form a lithium supplemented electrode sheet P1. The at least one surface of the electrode sheet P0 refers to one surface of the electrode sheet P0 or two surfaces of the electrode sheet P0. The lithium supplemented electrode sheet P1 can be formed by pressing the lithium foil L1 on the at least one surface of the electrode sheet P0.

In a possible embodiment, transferring the first release agent G1 to the first surface S1 of the lithium ribbon L0 specifically includes: providing a first transfer film T1 carrying the first release agent G1; and rolling the first transfer film T1 and the lithium ribbon L0, so as to transfer the first release agent G1 onto the first surface S1 of the lithium ribbon L0.

Rolling the first transfer film T1 and the lithium ribbon L0 specifically includes: periodically adjusting a gap between a first roller 41 and a second roller 51 that are used for rolling the first transfer film T1 and the lithium ribbon L0, so as to make the first release agent G1 discontinuously adhere to the first surface S1 of the lithium ribbon L0. Providing the first transfer film T1 carrying the first release agent G1 specifically includes: coating the first transfer film T1 with the first release agent G1. Providing the first transfer film T1 carrying the first release agent G1 specifically further includes: coating the first transfer film T1 with a first lubricant R1, wherein the first lubricant R1 and the first release agent G1 are applied alternatively, and providing the first transfer film T1 alternatively carrying the first release agent G1 and the first lubricant R1.

In a possible embodiment, transferring the second release agent G2 onto the second surface S2 of the lithium ribbon L0 specifically includes: providing a second transfer film T2 carrying the second release agent G2; and rolling the second transfer film T2 and the lithium ribbon L0, so as to transfer the second release agent G2 to the second surface S2 of the lithium ribbon L0.

Rolling the second transfer film T2 and the lithium ribbon L0 specifically includes: periodically adjusting the gap between the first roller 41 and the second roller 51 that are used for rolling the second transfer film T2 and the lithium ribbon L0, so as to make the second release agent G2 discontinuously adhere to the second surface S2 of the lithium ribbon L0. Providing the second transfer film T2 carrying the second release agent G2 specifically includes: coating the second transfer film T2 with the second release agent G2. Providing the second transfer film T2 carrying the second release agent G2 specifically further includes: coating the second transfer film T2 with a second lubricant R2, wherein the second lubricant R2 and the second release agent G2 are applied alternatively; and providing the second transfer film T2 alternatively carrying the second lubricant R2 and the second release agent G2.

The method for supplementing the electrode sheet with the lithium further includes the following steps: clearing the first release agent G1 from the first rolling wheel 1 that is used for rolling the lithium ribbon L0 with the transferred first release agent G1 and second release agent G2; and clearing the second release agent G2 from the second rolling wheel 2 that is used for rolling the lithium ribbon L0 with the transferred first release agent G1 and second release agent G2.

The method for supplementing the electrode sheet with the lithium in the application further includes the following step: collecting the first release agent G1 and second release agent G2 cleared off.

The foregoing detailed description describes the plurality of exemplary embodiments and is not intended to be limited to explicitly disclosed combinations. Thus, unless otherwise indicated, various features disclosed herein may be combined together to form a plurality of additional combinations not shown for the purpose of brevity.

What is claimed is:

1. A device for supplementing an electrode sheet with lithium, the device comprising:
a second rolling wheel, a lithium ribbon providing mechanism, a first transfer film conveying mechanism, a second transfer film conveying mechanism, an electrode sheet providing mechanism and two first rolling wheels,
wherein the two first rolling wheels are opposite each other, and the second rolling wheel is adjacent to one of the two first rolling wheels;
the lithium ribbon providing mechanism is located upstream from the second rolling wheel and the first rolling wheel adjacent to the second rolling wheel, and the lithium ribbon providing mechanism is used for feeding a lithium ribbon for a space between the second rolling wheel and the first rolling wheel adjacent to the second rolling wheel;
the first transfer film conveying mechanism is located upstream from the second rolling wheel and the first rolling wheel adjacent to the second rolling wheel, and the first transfer film conveying mechanism is used for conveying a first transfer film carrying a first release agent and transferring the first release agent to a first surface of the lithium ribbon;
the second transfer film conveying mechanism is located upstream from the second rolling wheel and the first rolling wheel adjacent to the second rolling wheel, and the second transfer film conveying mechanism is used for conveying a second transfer film carrying a second release agent and transferring the second release agent to a second surface of the lithium ribbon;
the electrode sheet providing mechanism is located upstream from the two first rolling wheels, and the electrode sheet providing mechanism is used for providing an electrode sheet for a space between the two first rolling wheels,
the second rolling wheel and the first rolling wheel adjacent thereto being used for pressing the lithium ribbon with the first release agent and the second release agent transferred on the first surface and the second surface respectively, thereby pressing the lithium ribbon into a lithium foil and making the lithium foil adhere to the first rolling wheel adjacent to the second rolling wheel; and
the two first rolling wheels are used for rolling the first release agent, the lithium foil and the electrode sheet that enter the space between the two first rolling wheels, thereby making the lithium foil adhere to the electrode sheet to form a lithium supplemented electrode sheet;
characterized in that,
the first transfer film conveying mechanism further comprises a first roller, a first unwinding roller, a first winding roller, and a first lubricant coating mechanism, the first unwinding roller is used for unwinding the first transfer film, the first winding roller is used for winding the first transfer film, the first lubricant coating mechanism is used for coating the first transfer film with a first lubricant, the first roller is used for transferring the first release agent to the first surface of the lithium ribbon; and
the second transfer film conveying mechanism further comprises a second roller, a second unwinding roller, a second winding roller, and a second lubricant coating mechanism, the second unwinding roller is used for unwinding the second transfer film, the second winding roller is used for winding the second transfer film, the second lubricant coating mechanism is used for coating the second transfer film with a second lubricant, the second roller is used for transferring the second release agent to the second surface of the lithium ribbon.

2. The device for supplementing the electrode sheet with the lithium according to claim 1, wherein
the first roller and the second roller are opposite each other, and
the first roller and the second roller are used for rolling the first transfer film carrying the first release agent, the lithium ribbon provided by the lithium ribbon providing mechanism and the second transfer film carrying the second release agent, so as to make the first release agent and the second release agent be transferred to the first surface and the second surface of the lithium ribbon respectively.

3. The device for supplementing the electrode sheet with the lithium according to claim 2, wherein the first roller is a hot roller, and the second roller is a hot roller.

4. The device for supplementing the electrode sheet with the lithium according to claim 2, wherein
a gap between the first roller and the second roller is adjustable, such that the first release agent and the second release agent can discontinuously adhere to the first surface and the second surface of the lithium ribbon respectively.

5. The device for supplementing the electrode sheet with the lithium according to claim 1, wherein
the first transfer film conveying mechanism further comprises a first release agent coating mechanism, the first release agent coating mechanism being used for coating the first transfer film with the first release agent; and
the second transfer film conveying mechanism further comprises a second release agent coating mechanism, the second release agent coating mechanism being used for coating the second transfer film with the second release agent.

6. The device for supplementing the electrode sheet with the lithium according to claim 1, wherein
the device for supplementing the electrode sheet with the lithium further comprises a lithium supplemented electrode sheet collection mechanism,
the lithium supplemented electrode sheet collection mechanism being located downstream from the two first rolling wheels, and the lithium supplemented electrode sheet collection mechanism being used for collecting the lithium supplemented electrode sheet.

7. A device for supplementing an electrode sheet with lithium, the device comprising:
two first rolling wheels, two second rolling wheels, two lithium ribbon providing mechanisms, two first transfer film conveying mechanisms, two second transfer film conveying mechanism, an electrode sheet providing mechanism,
wherein the two first rolling wheels are opposite each other, and each one of the second rolling wheels is corresponding to one of the two second rolling wheels, one of the two lithium ribbon providing mechanisms, one of the two first transfer film conveying mechanisms, and one of the two second transfer film conveying mechanism, each one of the second rolling wheels is adjacent to the corresponding first rolling wheel;
each one of the two lithium ribbon providing mechanisms is located upstream from the corresponding second rolling wheel and the corresponding first rolling wheel adjacent to the second rolling wheel, and the lithium ribbon providing mechanism is used for feeding a lithium ribbon for a space between the corresponding second rolling wheel and the corresponding first rolling wheel adjacent to the second rolling wheel;
each one of the two first transfer film conveying mechanisms is located upstream from the corresponding second rolling wheel and the corresponding first rolling wheel adjacent to the second rolling wheel, and the first transfer film conveying mechanism is used for conveying a first transfer film carrying a first release agent and transferring the first release agent to a first surface of the lithium ribbon;
each one of the second transfer film conveying mechanisms is located upstream from the corresponding second rolling wheel and the corresponding first rolling wheel adjacent to the second rolling wheel, and the second transfer film conveying mechanism is used for conveying a second transfer film carrying a second release agent and transferring the second release agent to a second surface of the lithium ribbon;
the electrode sheet providing mechanism is located upstream from the two first rolling wheels, and the electrode sheet providing mechanism is used for providing an electrode sheet for a space between the two first rolling wheels, the electrode sheet has two surfaces opposite each other,
each one of the second rolling wheels and the corresponding first rolling wheel adjacent thereto are used for pressing the corresponding lithium ribbon with the first release agent and the second release agent transferred on the first surface and the second surface respectively, thereby pressing the corresponding lithium ribbon into a lithium foil and making the lithium foil adhere to the corresponding first rolling wheel adjacent to the corresponding second rolling wheel; and
each one of the two first rolling wheels is used for rolling the corresponding first release agent, the corresponding lithium foil, and the electrode sheet that enter the space between the two first rolling wheels, thereby making the corresponding lithium foil adhere to one of the two surfaces of the electrode sheet to form a lithium supplemented electrode sheet;
characterized in that,
each one of the first transfer film conveying mechanisms further comprises a first roller, a first unwinding roller, a first winding roller, and a first lubricant coating mechanism, the first unwinding roller is used for unwinding the first transfer film, the first winding roller is used for winding the first transfer film, the first lubricant coating mechanism is used for coating the first transfer film with a first lubricant, the first roller is used for transferring the first release agent to the first surface of the lithium ribbon; and
each one of the second transfer film conveying mechanisms further comprises a second roller, a second unwinding roller, a second winding roller, and a second lubricant coating mechanism, the second unwinding roller is used for unwinding the second transfer film, the second winding roller is used for winding the second transfer film, the second lubricant coating mechanism is used for coating the second transfer film with a second lubricant, the second roller is used for transferring the second release agent to the second surface of the lithium ribbon.

8. The device for supplementing the electrode sheet with the lithium according to claim 1, wherein the device for supplementing the electrode sheet with the lithium further comprises a first clearing assembly and a second clearing assembly, the first clearing assembly being used for cleaning the first rolling wheel, and the second clearing assembly being used for cleaning the second rolling wheel.

9. The device for supplementing the electrode sheet with the lithium according to claim 1, wherein
the device for supplementing the electrode sheet with the lithium further comprises a collection tank, the collection tank being located below the second rolling wheel and the corresponding first rolling wheel and configured to collect lithium scraps.

10. The device for supplementing the electrode sheet with the lithium according to claim 1, wherein
a surface roughness of the first release agent is greater than that of the second release agent.

\* \* \* \* \*